J. B. FAIRBANK.
Hand-Seeder.
No 19,329.  Patented Feb. 9, 1858.
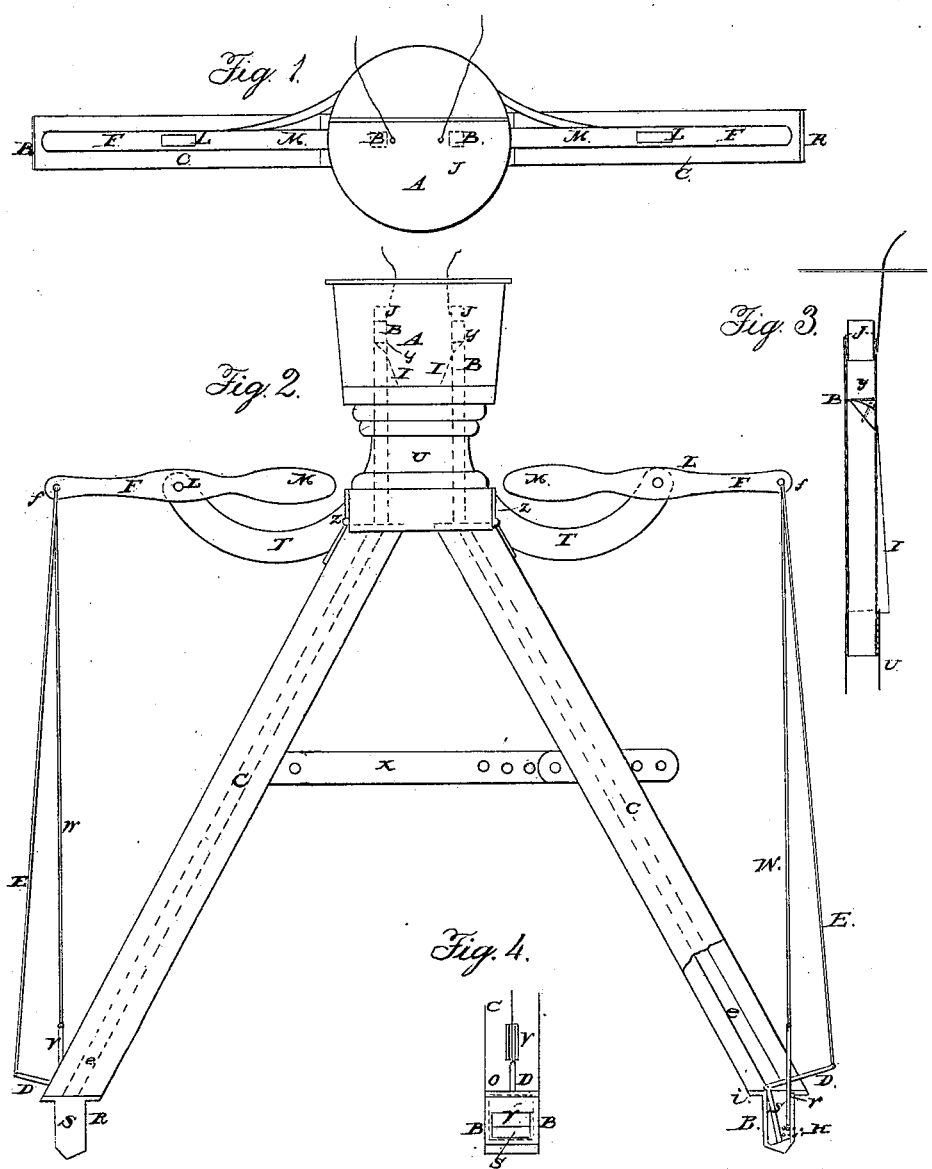
Inventor,
John B Fairbank

UNITED STATES PATENT OFFICE.

JOHN B. FAIRBANK, OF NEW YORK, N. Y.; JOSHUA FAIRBANK AND EDWIN C. DURFEE, OF LEON, N. Y., ADMINISTRATORS OF SAID FAIRBANK, DECEASED.

IMPROVEMENT IN HAND CORN-PLANTERS.

Specification forming part of Letters Patent No. 19,329, dated February 9, 1858.

*To all whom it may concern:*

Be it known that JOHN B. FAIRBANK, of the city of New York, in the county of New York and State of New York, invented in his life-time certain new and useful Improvements in Corn-Planters, the construction and operation of which we have described in the following specification and illustrated in the accompanying drawings with sufficient clearness to enable competent and skillful workmen in the arts to which it pertains or is most nearly allied to make and use his invention.

The nature of the said invention consists in so constructing the parts of the machine as to make it capable of depositing the seed in the ground in a new position with regard to the depositing apparatus from that given it by the ordinary hand corn-planter in use—viz., by pressing it out at the side of the rectangular tube that carries it into the soil—as more fully set forth in the subjoined specification; and to accomplish this object more effectually the seed-hopper is located in a central position, and the corn is conducted from it through the inclined tubes to the depositing-cups, the corn for both tubes being measured from this central hopper.

In the accompanying drawings, Figure 1 is a plan or top or view. Fig. 2 is a side elevation, showing one of the legs P in section to illustrate its internal construction and arrangement, and the construction and operation of the seed-thrusting apparatus and concomitant parts. Fig. 3 is a detached sectional elevation of one of the seed-measuring tubes within the hopper. Fig. 4 is an elevation of one of the legs P, the side of it upon which the seed is discharged being represented toward the observer.

A is the hopper in which the seed is placed. B B are seed-measuring tubes by which the seed from the hopper is delivered to the inclined conducting-tubes in the legs C, which lead to the depositing-cups R. These tubes B are fitted into holes or openings in the support U, which forms the bottom of the hopper, sufficiently loosely to allow them to slide freely up and down within them. These tubes are allowed to slide freely down into the corn in such a manner that the corn is allowed to flow into their tops and fill the seed-boxes above the spring bottom or valve $y$. The amount of seed which these seed-tubes will contain is adjusted by the short tubes J J, which fit into the tops of the tubes B sufficiently tight to keep them in place when in operation, but may be moved to regulate the measurement of seed. The tubes B would naturally descend into support U, and while they are in this position the valves $y$ remain closed. A string or cord, G, is, however, attached to these tubes, and when the planter is used this cord is placed over the neck of the operator, and as he presses the machine down to introduce the depositing-tubes into the earth the tubes B are raised so as to bring their tops above the corn in the hopper, and as they continue to be raised, or, rather, as the machine continues to descend, the check-cords I, which are attached at one end to the bottom of the hopper and at the other to the hinged spring-bottom $y$ of the measuring-cup, draw the seed-cup bottom downward and permit the corn to fall through to the lower portion of the sliding tubes B B, and from this through the inclined conducting-channels $e$ $e$ to the depositing-cups R R. As the machine is again raised the tubes B B fall back into their previous position, and the valves $y$ are closed, to be again operated by the same process. When the seed falls into the depositing-cups it is retained between the swing plates or thrusters S S and the slides V V, where it remains till the downward pressure of the hand of the operator upon the levers M M raises the slides V V and swings out the plates S S to force the seed laterally into the ground. These levers M F M F are hung upon fulcrums at L, and are connected at $f$ by wire rods or cords W to the slides V, and by like rods or cords E to the levers D, which are attached to the thrusting-plates S, which are hung upon the fulcrum at O. The depositing-boxes R R are first thrust into the ground the proper depth for depositing the seed, after which the pressure, as above stated, upon the levers simultaneously raises the slide V and gives a lateral motion to the thruster S, which forces the seed out sidewise into the wet soil at the side of the depositing-cups, and these depositing-cups being thus withdrawn before the thruster is allowed to return, the seed remains in the position in which it is deposited.

In depositing corn in the ground it is essential that it be deposited in wet dirt, in order that it may sprout before the fall of additional rains; but the dirt upon the surface of the soil is usually dry. Many hand seed-planters carry down this dirt and deposit the seed upon it, and all deposit it in the ground without covering it by a side thrust. This machine is intended to remedy this defect by placing the seed under the natural soil, thus covering it and leaving it in wet soil, as represented.

The distance between the rows of corn is gaged by the cross-bar X, which adjusts the inclination of the conducting-channels by means of a set-screw, as shown, the conductors turning upon the hinges Z, as shown.

It will readily be perceived that instead of operating the slides or measuring-tubes B by a cord round the neck of the operator, they may be raised by the end or arm of the levers M M.

Various means may be used for thrusting out the corn from the depositing-tubes R by performing substantially the operation of giving the side thrust to the seed, but all in some way or form using essentially the side-thrust apparatus or side-opening cups R, as herein described. In order to give a variable motion to the rods E and W, so that W may move more rapidly or farther than E or previous to it, the bearing at $f$ may be slotted for E, or any equivalent device used which will give the required motion. It may in some soils and under some circumstances be desirable and even necessary to cause the slide V to descend and close the side opening in the depositing-cup before the thruster is withdrawn, to prevent the return of the seed. This motion may be given as above described, or in any manner of perhaps a dozen different ways, yet performing the same duty in substantially the same manner.

The particular improvements which constitute the said invention, and which are claimed as having been originally and first invented by the said JOHN B. FAIRBANK, are—

1. The adjustable measuring-cups B, with a movable bottom operated by the upward motion of the cups relatively to other parts, as specified.

2. The thruster S and slide V, or their equivalents, when used for giving the side pressure to the corn, in the manner and for the purposes above stated.

JOSHUA FAIRBANK.
EDWIN C. DURFEE.

Witnesses:
LEONARD CLARK,
HARVEY H. HOLMES.